United States Patent [19]

Studtmann et al.

[11] Patent Number: 5,170,310

[45] Date of Patent: Dec. 8, 1992

[54] FAIL-RESISTANT SOLID STATE INTERRUPTION SYSTEM

[75] Inventors: George H. Studtmann, Mount Prospect; Donald H. Ward, Glen Ellyn, both of Ill.; James V. Fixemer, Denton, Nebr.; Julius M. Liptak, Knightdale, N.C.

[73] Assignee: Square D Company, Palatine, Ill.

[21] Appl. No.: 619,776

[22] Filed: Nov. 29, 1990

[51] Int. Cl.$^5$ .............................. H03K 17/08
[52] U.S. Cl. ........................ 361/94; 361/65; 361/79
[58] Field of Search ........... 361/94, 100, 65, 78, 361/79, 13, 7, 5, 18, 88; 307/38, 39

[56] References Cited

U.S. PATENT DOCUMENTS

| | | | |
|---|---|---|---|
| 3,558,983 | 1/1971 | Steen | 361/100 |
| 3,611,043 | 10/1971 | Steen | 361/100 |
| 3,646,398 | 2/1972 | Kotos | 361/100 |
| 4,663,691 | 5/1987 | Köppl | 361/65 |

Primary Examiner—A. D. Pellinen
Assistant Examiner—S. Jackson
Attorney, Agent, or Firm—Kareem M. Irfan; Robert J. Crawford

[57] ABSTRACT

A solid state circuit interruption arrangement in a distributed power network provides fast and reliable circuit interruption. A common power source provides power to a plurality of loads via respective current paths. A main circuit breaker and a plurality of solid state circuit breakers are arranged to interrupt the current paths in response to command signals sent from a central controller. Current sensors and voltage sensors are coupled to the current paths for monitoring purposes. An automatic controller responds to any of the current sensors detecting a fault condition by automatically generating a command signal, which forces the associated solid state breaker to interrupt the associated current path. Thereafter, the controller automatically generates a signal to the main circuit breaker to interrupt the power provided from the common power source in the event that the associated current path is not interrupted by the solid state breaker. Alternatively, or in addition, the main interruption device may interrupt the current path when its own internal sensing mechanism detects a magnitude of current that is beyond a predetermined level. Also, the controller automatically generates a signal to the main breaker to interrupt the power provided from the common power source in the event that any of the branch breakers fails in the "off" or interrupted, condition. Other features include a finned housing structure which provides cooling means for the breaker system without the need for cooling fans.

36 Claims, 7 Drawing Sheets

FAIL-RESISTANT SOLID STATE INTERRUPTION SYSTEM

FIELD OF THE INVENTION

The present invention relates generally to circuit breakers, and, more particularly, to solid state circuit interruption systems.

BACKGROUND OF THE INVENTION

Circuit breakers have been traditionally implemented using electromagnetic components to break a current path in response to an overload current. While these devices are necessary and useful in many applications, there have been substantial efforts to replace them, at least in part, with solid state technology. For example, U.S. Pat. Nos. 4,631,621, 4,626,907, and 4,700,256 each by Howell, disclose solid state circuitry in combination with mechanically switched contacts to address problems relating to voltage arcs between the mechanically switched contacts. This arc problem occurs when the mechanical contacts separate, i.e., when the current path is interrupted, and is known to cause contact and other component related problems.

Solid state circuit breakers that provide a conductive path between the line and the load without mechanically switched contacts have also been described. For instance, in U.S. Pat. No. 4,713,720, Rogers et al., a solid state AC circuit breaker includes a power transistor in a current path between a source and a load. The current path is monitored to determine when an overload current is present, at which time the power transistor is turned off to break the current path.

This type of circuit breaker poses a problem should the solid state switch fail. That is, when a device fails, it predominantly reverts to a low impedance state or "shorted" condition whether it is initially in either the "on" or "off" state.

If failure occurs when the device is conducting current into a load, it will not interrupt the current on command and, hence, loads such as motors may not be turned off at critical times which may cause damage to associated equipment. If failure occurs when the device is clearing a fault, the circuit breaker will have lost its protective function.

A third case arises in which the switch may fail shorted when it has been turned off. Power is then applied inadvertently to a load which may, for example, cause motors to start.

Another problem associated with solid state interrupters is the relatively high cost of the solid state switches and the associated electronic control circuits.

Solid state interrupters also generate a significant amount of heat. Conventional circuit board panels become excessively hot if used to house these devices.

These problems have posed a serious obstacle to the commercial viability of solid state interrupters. They have typically been limited to very special applications such as military or small DC power supplies.

Accordingly, there is a need for a solid state circuit breaker that overcomes these problems.

SUMMARY OF THE INVENTION

The present invention provides a static switch interruption arrangement which overcomes the aforementioned problems. In a preferred embodiment, a solid state interruption arrangement includes a main interruption device and a solid state interruption device connected in series in a current path between a source and a load for interrupting current flow therebetween. A sensor is located in series with the solid state interruption device. In response to the sensor, a controller is capable of automatically generating a first signal to cause the solid state interruption device to interrupt the current path, and is capable of automatically generating a second signal to cause the main interruption device to interrupt the current path in the event that the solid state interruption device fails. Alternatively, or in addition, the main interruption device may interrupt the current path when its own internal sensing mechanism detects a magnitude of current that is beyond a predetermined level.

Voltage sensors and/or current sensors and associated circuits are also provided to sense the failure of a switch in the "off" condition. The central controller uses this information to cause the main interrupting device to interrupt the current path.

In another preferred embodiment, a solid state circuit interruption arrangement is provided in a distributed power network having a common power source for generating power to a plurality of loads so as to establish a plurality of current paths emanating from the source. The arrangement includes a main circuit breaker which is connected to receive the power from the source and a plurality of solid state branch circuit breakers. Each solid state breaker includes an input port connected to the main circuit breaker and an output port connected to one of the loads.

Each of the plurality of current sensors is coupled to the current path of an associated one of the solid state breakers, and each of a plurality of voltage sensors is arranged to measure either the output voltage of said solid state circuit breaker with respect to a return conductor or the voltage across the solid state breaker switch. A central controller responds to each of the current sensors for detecting a fault condition in one of the current paths and automatically generates a signal to the associated solid state breaker so that the associated current path is interrupted when the condition is detected. Thereafter, the controller automatically generates a signal to the main circuit breaker to interrupt the power provided from the common power source in the event that the associated current path is not interrupted by the solid state breaker.

Alternatively, or in addition, the main interruption device may interrupt the current path when its own internal sensing mechanism detects a magnitude of current that is beyond a predetermined level. Also, the controller automatically generates a signal to the main breaker to interrupt the power provided from the common power source in the event that any of the branch breakers fails in the "off" condition.

The use of a plurality of solid state breakers in a system, with a single main circuit breaker and a single central controller, provides a more cost-effective solution than implementing each solid state breaker and its controls separately.

A suitable means of cooling the devices is provided by means of a panel which includes a finned heat exchanger. The central electronic controller is housed in this panel which may contain the main circuit breaker and/or control push buttons for external control.

BRIEF DESCRIPTION OF THE DRAWINGS

Other objects and advantages of the invention will become apparent upon reading the following detailed description and upon reference to the drawings in which.

While the invention is susceptible to various modifications and alternative forms, an exemplary embodiment thereof has been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1:
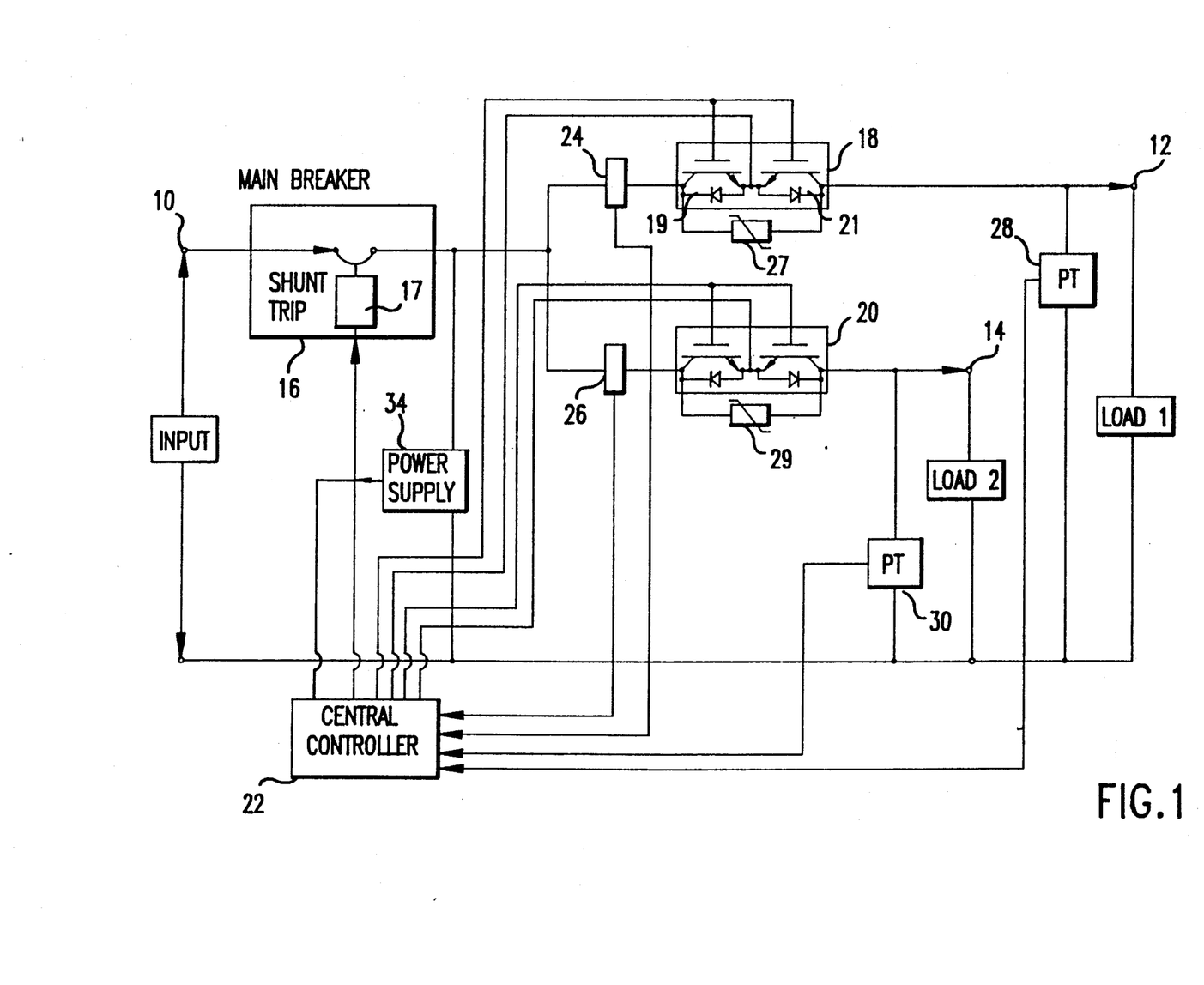
FIG. 1 is a circuit diagram of a solid state interruption arrangement, according to the present invention.

While the present invention is generally directed to systems using solid state switches or their equivalent, it has been found to be particularly advantageous for a system of circuit breakers typically found in a load center having a main circuit breaker and a plurality of branch breakers. FIG. 1 is exemplary of such a system, wherein a power source at terminal 10 provides power to a plurality of loads at terminals 12, 14.

In accordance with the present invention, the system illustrated in FIG. 1 includes a main circuit breaker 16 with a shunt trip 17 and a plurality of solid state branch breakers, two of which are depicted as 18 and 20. Further, a central controller 22 is included for providing reliable power-interruptable control to the loads. These components are arranged so that the controller 22 can automatically generate control signals to cause the solid state branch breakers 18 and 20 to interrupt the associated current path when the current in that path exceeds a predetermined threshold. To monitor the current path, a current detector 24 or 26, e.g., a current transformer, may be coupled to each current path in which the branch breakers 18 and 20 reside. Similarly, to monitor the output voltage, a potential transformer 28 or 30 is coupled to the output of each branch breaker 18 or 20 and its return conductor.

The central controller 22 continues to monitor these current sensors after generating the control, or interruption, signals to the branch breakers 18 and 20. After commanding such an interruption, in response to the sensors indicating that the predetermined threshold is still exceeded (and that the branch breaker has failed), the central controller 22 automatically generates another signal to cause the main circuit breaker 16 to interrupt the current path using the shunt trip 17. In addition, conventional internal current sensing means, e.g., thermal and magnetic trips, may be used with the main breaker to interrupt the current in the event that a branch breaker fails to clear a fault. Additionally, if the central controller 22 detects (by means of the output voltage sensors) that an output voltage exists (say above 10 volts) after the associated branch breaker has been signalled to interrupt the current path (either because of an overload or fault condition or an external "break" signal), then the controller 22 sends a signal to cause the main breaker 16 to open.

It should be noted that a shunt trip may be used to open a conventional circuit breaker in ground fault interruption (GFI) systems. Although the sensing system herein described is different from that used in GFI, a similar safety function is achieved. It also should be noted that although the safety system described deactivates the entire system of breakers, this will happen very infrequently given sufficient safety margins in the design of the components. Also, this occurrence is not unheard of with conventional systems which will deactivate a main breaker in the event of a substantial short circuit on the output of a branch breaker or the failure of branch breaker while clearing a fault. The solid state branch breakers interrupt the current at low levels so rapidly that the main breaker will not be affected. Therefore, that undesirable condition has been eliminated. However, failure of a solid state branch breaker will deactivate the main breaker.

Accordingly, in the event that the branch breakers 18 and 20 fail to interrupt the current path when commanded by the central controller, or if they fail and complete a conductive circuit from line to load when they are supposed to be turned off, the main circuit breaker acts as a backup.

A special condition may exist in the case of a motor or capacitor load. In these cases the back EMF of the motor or the voltage on the capacitors may be sensed as an output, even though the branch breaker 18 or 20 has properly interrupted the current path. The controller 22 would then detect what appears to be a failed breaker, and the main breaker 16 would be opened by the controller. To avoid this problem, a time delay function may be included with the controller 22 which delays the tripping of the main breaker 16 to allow the motor to slow down and the back EMF to decay to an acceptable value. This time delay would be the same as that encountered in a system using electromechanical breakers. That is, if a breaker is manually opened prior to working on the wiring, the output voltage must be checked to make sure that no voltage exists due to the back EMF of motors or charged capacitors.

The breaker switches 18 and 20 for a DC system may be any number of a variety of solid state devices, such as Darlington transistors or IGBT's. For an AC system, it is necessary to provide a switch that can conduct current and block voltage in either direction. Various means are known to implement an AC switch such as using a unilateral switch within a diode bridge or two devices that have reverse blocking ability (but only unilateral conducting capability) in inverse parallel.

As shown in FIG. 1, two devices (that have unilateral blocking and bilateral conducting capability) 19 and 21 may also be used in inverse series. The switches shown are IGBT's that have a reverse diode in parallel with the device which provides a conductive path for current flowing through the complementary device. Of course, any single bilateral device may be used as a switch should one ever become available.

Conventional transient suppressors 27 and 29, for example, metal oxide varistors, are provided across each branch breaker. Alternatively, a suppressor may be connected at the input to the breaker across the incoming line and another suppressor connected at the output of the breaker across the load. These suppressors serve to absorb inductive energy stored in the line or the load when the switch interrupts the current.

The current transformers (or other current sensing means) and potential transformers or the aforementioned voltage amplifiers are conventional. The transformers may be implemented as described in co-pending U.S. patent application Ser. No. 07/503,267 entitled Waveform Capturing Arrangement in a Distributed Power Network, assigned to the instant assignee and incorporated herein by reference.

The central controller 22 is preferably implemented using a programmable microcomputer with I/O control. To provide the instant interruption afforded by the solid state devices in the event of a short circuit, dedicated ASIC's may be used for each branch if the desired microcomputer may not be fast enough. The microcomputer will monitor long-term overloads and do all of the supervisory functions necessary for proper operation of the breaker. It may also serve to interface with external controllers such as desktop computers as described in the same co-pending U.S. application Ser. No. 07/503,267, with the desktop computer being remotely located from the branch breaker. The latter arrangement allows a user to implement control over the network automatically yet with the availability to override such control manually for maintenance, testing, and related activities. Another acceptable controller implementation includes a conventional arrangement of digital circuitry with an analog interface at its input ports for Boolean logic control.

The power to operate the electronics and controls of each solid state breaker 18 or 20 may be taken from a voltage transformer power supply 34 that is connected across the power lines after the panel main breaker 16. This is in contrast to the fault powered supplies that supply power to present day electronically tripped breakers. It is conventional practice, for instance, to open an upstream breaker to de-energize the circuit before installing a breaker. It is possible that the conventional electronically tripped breaker may have been activated manually and that the output line has been shorted. When the upstream breaker is re-closed, the line voltage will be very low due to the short circuit, thereby preventing the extraction of energy from a line operated power supply. Therefore, current transformers are commonly used which take energy from the fault current and supply the electronics which will detect the fault and trip the breaker in a satisfactory manner.

The situation is different, however, in the case of the solid state breaker. The solid state switch is normally off and appropriate time delays can be incorporated into the logic to allow the power supplies to charge up to the proper level before the solid state switch can be turned on by a "make" signal. Therefore, the breaker can satisfactorily sense and interrupt the fault current due to a shorted output line on start-up.

In the event that both the solid state switch and the output line are shorted, the magnetic trip unit of the main panel breaker will provide the necessary protection. This would also protect against a short circuit of the output lines of the main panel breaker upon start-up.

The system described in connection with FIG. 1, which senses the output voltage of the breaker to determine if a switch failed when it was in the off state, functions satisfactorily for a single phase system as shown or for a multiphase system wherein the neutrals are interconnected. However, it may not function satisfactorily for all failure modes in a multiphase system wherein there is no common interconnection between the load and the source such as shown in FIG. 2.

Figure 2:
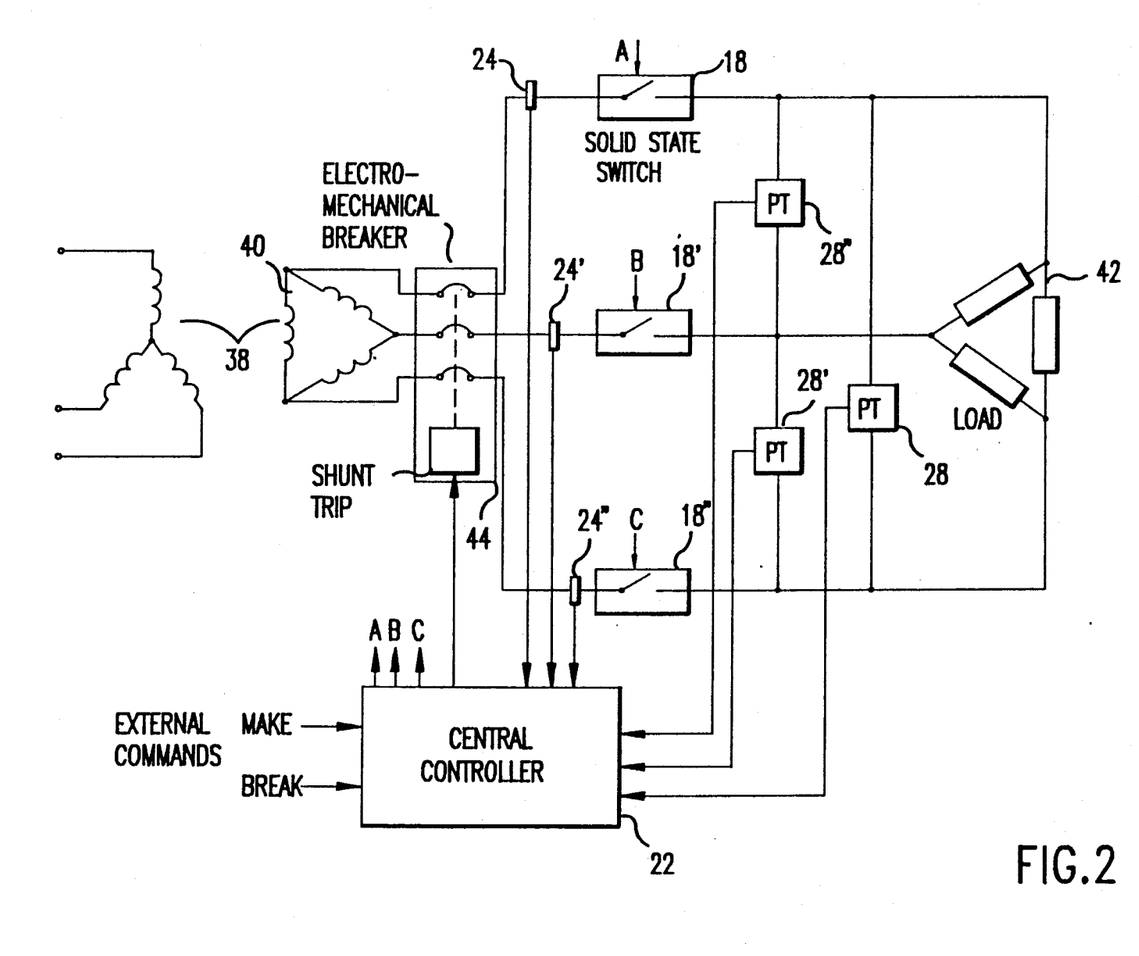
FIG. 2 is a diagram showing a three phase delta connected system, according to the present invention, in which there is no common neutral connection between the load and source.

In FIG. 2, an input transformer 38 having a delta-connected secondary winding 40 supplies power to a delta-connected load 42 through a conventional electromechanical breaker 44. No ground connections are assumed to exist. Further, assume that the output voltage of each solid state switch 18, 18' or 18" is sensed to detect a switch failure and that all three switches are supposed to be off. If one switch fails, then no voltage is detected across the load (except that due to device leakage and system capacitance) and the failure may not be detected.

Figure 3:
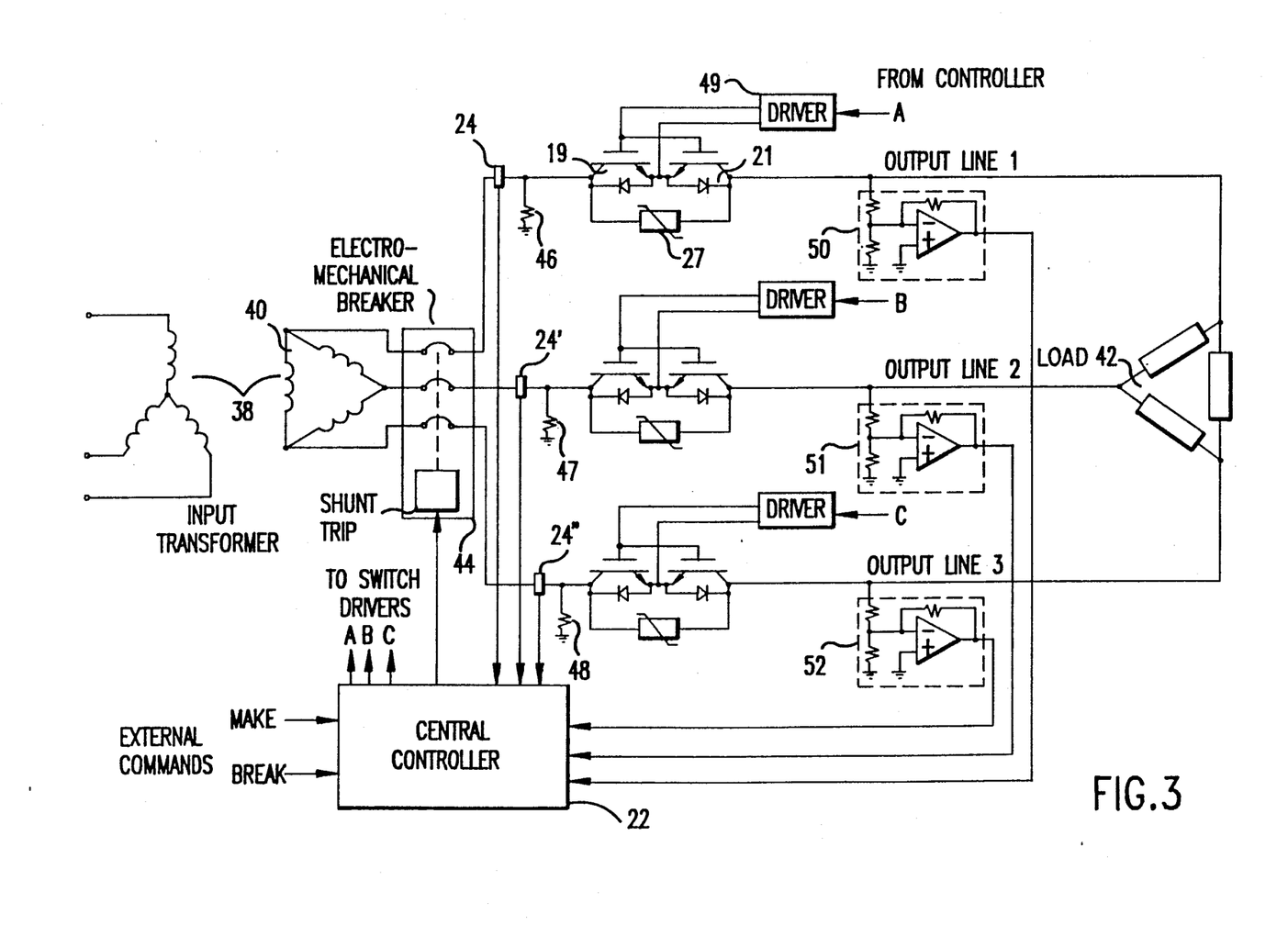
FIG. 3 is a system diagram, according to the present invention, using output voltage sensing to detect failed switches in a normally ungrounded delta connected system.

This problem is overcome with the arrangement of FIG. 3, wherein an ungrounded system includes relatively high value resistors (e.g., using 47K ohm for a 208 v or 240 v system) 46-48 from each input line to ground. Output voltage sensing may then be provided, as shown in FIG. 3, from each output line to ground by means of conventional operational amplifier circuits 50-52. For sensing purposes, an artificial neutral is thus provided by the resistors 46-48 from the input lines to ground. The capacitance of the transformer windings and wiring to ground will also act as part of this artificial neutral. The drivers 49a-c in FIG. 3 are used where necessary to amplify the signals generated by the controller 22 and to provide voltage isolation from line-to-line and lines to control circuit.

If the solid state switches are turned off by the controller 22 and yet the voltage sensed by one or more amplifiers is above a safe threshold (e.g., 10 V), the controller 22 will recognize a switch failure and will automatically provide a signal to trip the electromechanical main breaker 44. The reference level or threshold at which the system trips the main breaker 44 determines the amount of leakage that is tolerated in the solid state switch before it is recognized as having failed. In the case of motor or capacitor loads, it is desirable to incorporate a time delay to allow motor back EMF or capacitor charge to decay so that false tripping is prevented.

Figure 4:
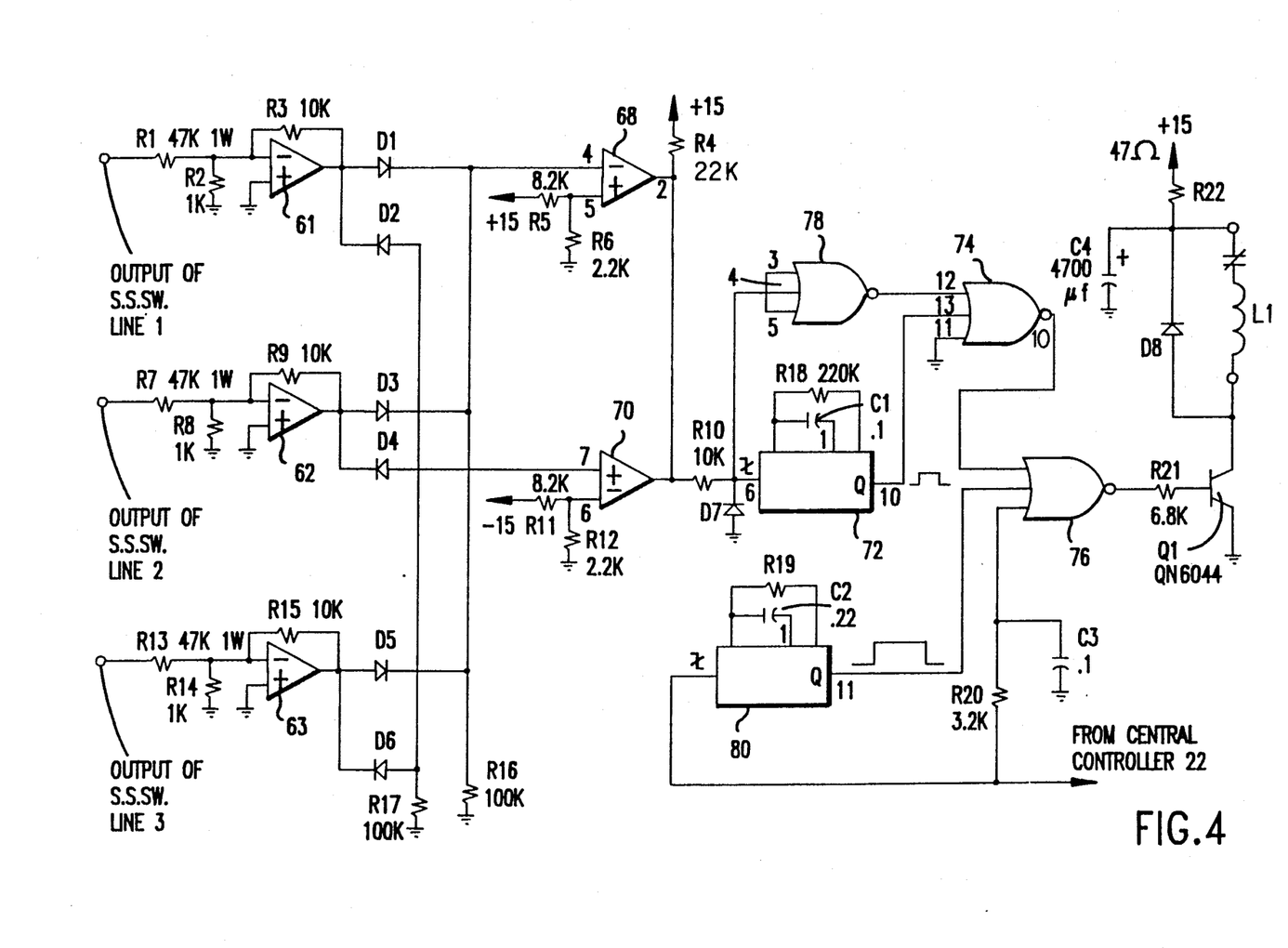
FIG. 4 is a circuit diagram of a preferred arrangement, according to the present invention, for detecting failed solid state switches in the system shown in FIG. 3.

An example of a circuit to implement the detection of failed solid state switches in a three phase system using the output voltage sensing method is shown in FIG. 4. The circuit of FIG. 4 may also be applied to a plurality of solid state switches of a single phase system. The circuit as shown consists of three amplifiers 61-63 to monitor the voltage at the output of each of three solid state switches. The outputs of the amplifiers are rectified by diodes D1-D6. The positive rectified outputs are combined and applied to a comparator 68 and the negative outputs are applied to a second comparator 70. If either the positive or negative peak voltage applied to the comparators 68 and 70 exceeds a reference level, the respective comparator output drops low, triggering a monostable multivibrator 72 which, through a NOR gate 74, applies a low logic level to pin 1 of NOR gate 76. If the other inputs to NOR gate 76 are also low, the output at pin 9 will go high providing a signal to the driver Q1 of the shunt trip coil L1 and opening the electromechanical breaker (not shown). The duration of the output pulse from the multivibrator 72 is sufficient to operate the shunt trip breaker. If the failure of several switches occurs, the output of the comparators 68 and 70 will be low continuously and will not trigger the multivibrator 72. In that case, NOR gate 78 inverts the low logic level and applies it to NOR gate 74 whose output then will be low providing the necessary failure signal to pin 1 of NOR gate 76. A second monostable multivibrator 80 provides a delaying pulse from the time at which the central controller commands the solid state switches to open. This delay allows time for the voltage of the output loads (such as motors) to decay so that false trips are avoided.

It may be necessary to provide a delay on initial start-up to prevent transients generated by closing the main breaker (or upstream breakers) from activating the shunt trip. This may be accomplished in various ways; for example, this may be accomplished by delaying the application of the DC supply voltage to the logic and control circuits. The diode D8 protects Q1 from transient voltages. Capacitor C4, charged through R22, provides high current to the shunt trip coil L1 without requiring a large power supply. The normally closed contact in series with the shunt trip coil opens when the breaker is tripped and is closed when the breaker is manually reset. This is standard practice for shunt trip breakers. However, the illustrated circuit works just as well without a contact in series with the coil.

The values of the components shown in the circuit of FIG. 4 are suitable for a three phase 208 v circuit but are not restricted to those particular values. The voltage ratings of R1, R7, and R13 should be sufficient to withstand the highest voltage that will exist from line to ground. With a 208 v system, the voltage from line to ground will be 120 v and the power in R1, 47K will be 0.3 watts so that a 1 or 2 w resistor rating is sufficient. The amplifier gain is R3 (10K) divided by R1 (47K) or 0.213. The circuit values shown cause the breaker to trip when the voltage at the output of the solid state switch exceeds 17 v peak (12 v RMS). The 17 v level at the output of the switch is reduced to 3.6 v at the output of amplifier 61 because of the gain factor of 0.213. The diode voltage drop of about 0.4 v results in 3.2 v at the comparator inputs. The voltage dividers R5, R6, and R11, R12 provide a reference voltage of 3.2 v at each comparator, so that any voltage higher than the reference will result in an output change and will trip the main breaker.

Resistors R2, R8, and R14 are protective resistors which prevent the voltage at the inputs of the operational amplifiers from going above a safe level when the amplifier is driven beyond its linear range.

The integrated circuits (IC) in FIG. 4 may be implemented using the following commercially available components: amplifiers 61–63 using a TL074CN-type IC; the comparators 68 and 70 using a LM339N-type IC; multivibrators 72 and 80 using CD4047BE-type ICs; and NOR gates 74, 76 and 78 using a CD4025BE-type IC.

Figure 5:
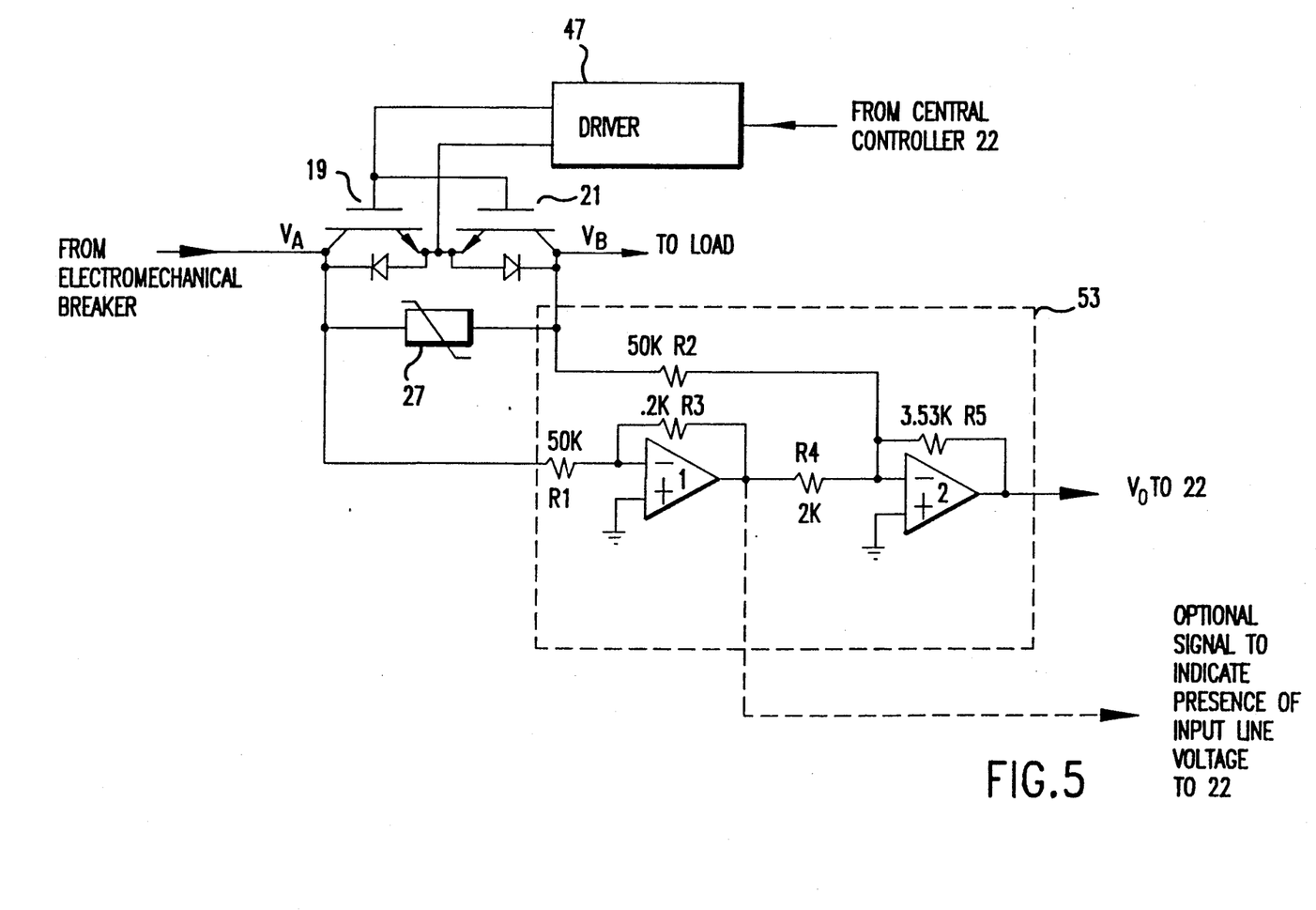
FIG. 5 is a circuit diagram of a differential amplifier, in accordance with the present invention, which may be used to measure the voltage across each of the solid state switches illustrated in FIG. 3 as an alternative to output voltage sensing.

Another method of sensing is to sense the voltage across each solid state switch by means of a differential amplifier 53 as shown in FIG. 5. If the switch is in the off state, then the voltage across the switch is substantial if the switch is operative. However, if the switch has failed, then the voltage across the switch drops to a lower value depending on the degree of leakage that it has developed or whether it is actually shorted. Comparing this voltage with the voltage that should exist depending on the condition commanded by either the external "break" signal or the fault and overload sensing signals allows rapid and accurate determination of the state of the switch. If a failed switch is indicated, then the controller 22 immediately signals the main breaker 44 to open.

This method of sensing satisfactorily predicts the condition of the solid state switch under all load conditions. In the case of motor or capacitor loads, it is desirable to incorporate a time delay to allow motor back EMF or capacitor charge to decay so that the reading is accurate. For example, at the first instant after a breaker supplying a motor load is opened, its back EMF will subtract from the line voltage and tend to reduce the voltage across the switch to a low value. The sensing system would detect this low value for a failed switch and cause the main breaker to be tripped. Incorporating a time delay to delay the tripping of the main breaker will eliminate this problem.

Conventional operational amplifiers used in a high common-mode voltage instrumentation amplifier circuit are capable of sensing the switch voltage properly even on lines operating at voltages up to 600 volts and beyond. Since the amplifier circuit input may have a relatively high impedance, it may be necessary to connect bleeder resistors across the output of the breaker so that proper readings are obtained under complete no load conditions. These resistors will dissipate negligible power. Alternatively, the amplifier input resistors on the load side may be chosen to perform this function.

The output voltage of the circuit of FIG. 5 is given by the following equation:

$$V_0 = \left( V_A \times \frac{R3}{R1} \times \frac{R5}{R4} \right) - V_B \times \frac{R5}{R2}$$

The resistor values shown in FIG. 5 may be used for a system with 120 v RMS line to neutral. If the solid state switch is open, $V_B = 0$ and $V_o$ may be calculated to be 12 v peak. If the switch has some leakage such that the $V_B = 15$ v peak, then $V_o$ is found to be about 10.9 v peak. If the switch is shorted, $V_B = 170$ v peak and $V_o = 0_v$. Thus, $V_o$ varies from 12 v for a completely open switch to $0_v$ for a shorted switch. The central controller can be designed or programmed to recognize a particular level of $V_o$ as the threshold below which the switch will be considered failed.

The output level $V_o$ of the differential amplifier circuit 53 of FIG. 5 is a valid indication of the condition of the solid state switch provided that the input voltage $V_A$ to the switch is normal. Under conditions of momentary dropout or interruption of incoming power, the capacitors of the controller power supply would keep it functioning and the momentary absence of voltage from the input of the switch would produce an output $V_o$ that might be interpreted as a failed switch. To prevent this condition, a signal may be used to advise the controller of the presence or absence of line voltage at the input of the solid state switch. Such a signal can be obtained from the output of amplifier 1 in FIG. 5.

Current sensors may be used as an alternative or in addition to voltage sensors for determining if the switch has failed in the "off" condition. In this case, either the current sensors used to monitor load current may be used with additional electronics to detect low levels of current on the order of a few milliamperes or other current sensors may be used along with the regular load monitoring sensors for this purpose.

Figure 6:
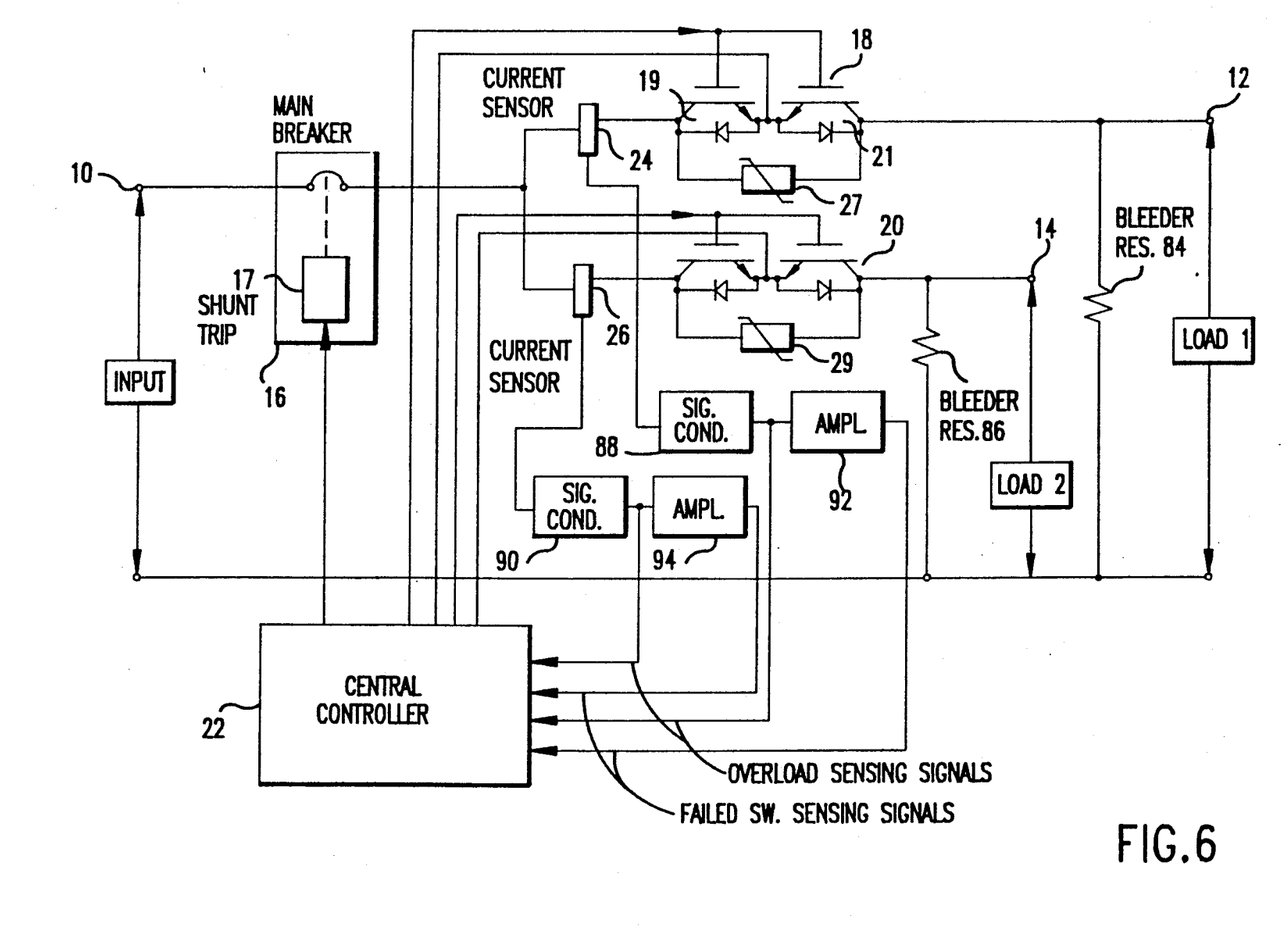
FIG. 6 is another system diagram in accordance with the present invention, in which current sensing is used to detect a failed switch.

FIG. 6 illustrates the use of the same current sensor for both functions. In this case, signal conditioners 88 and 90 are followed by amplifiers 92 and 94. The signal conditioners act as full-wave rectifiers and amplifiers to provide a calibrated overload sensing signal for the input of the controller 22, while the amplifiers 92 and 94 provide additional sensitivity to measure levels of leakage current to indicate a failed solid state switch.

A bleeder resistor 84 or 86 is provided across the output of each solid state breaker 18 or 20. On a 120 v circuit this might be on the order of 50K ohms which would draw 2.4 milliamperes of current when the switch is closed. When the switch is turned off, this current should be some low value due to leakage resistance of the switch, but if the switch has failed, the current sensor and associated circuit will detect a value in excess of the allowable leakage current and will send a signal to the central controller to trip the main electromechanical breaker.

In the case of an ungrounded three phase system wherein the neutrals of the source and the load are not interconnected, the current sensing method might not detect a single failed switch. However, by the use of bleeder resistors 84 and 86 from each output line to ground and resistors from each input line to ground (not shown), a current path is provided so that a failed switch in one or more lines can be detected. The resistors would typically be on the order of 50K ohms or more so that negligible power would be dissipated.

While either voltage sensing or current sensing may be used to detect a switch that has failed in the "off" condition, it may be advantageous in some instances to use a combination of both methods. Thus, if the output voltage is in excess of some safe threshold value, or if the current through the switch exceeds an allowable safe value, then the controller will provide a signal to open the main breaker.

It may also be advantageous to provide a network at the input to the main breaker and/or between the main breaker and the solid state switches to attenuate transient voltages. Circuits of this type are well known in the art.

Figure 7A:
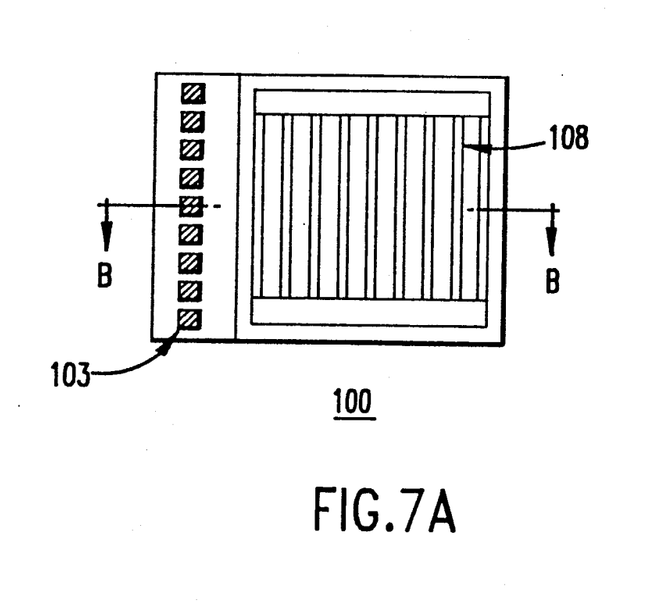
FIG. 7a is a front view of a circuit breaker panel configured to encase the solid state interruption arrangement of FIG. 1.
Figure 7B:
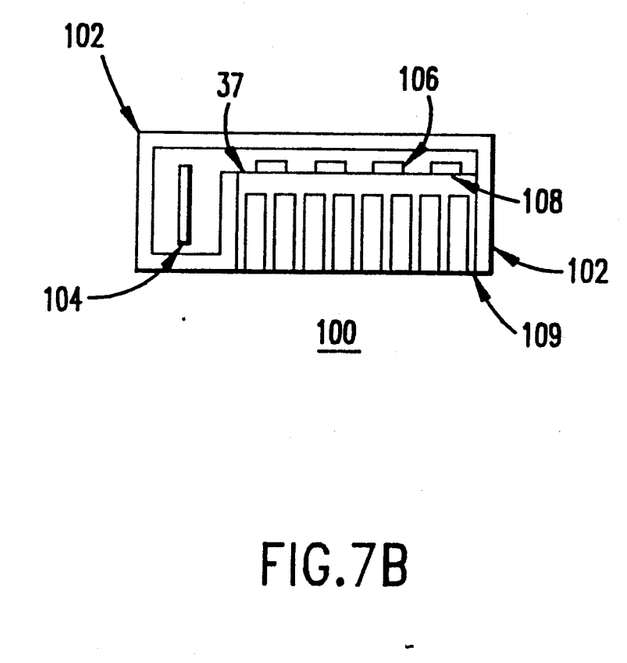
FIG. 7b is another view of the circuit breaker panel of FIG. 7a taken along line B—B'.

FIGS. 7a and 7b respectively illustrate front and cross-sectional views of a circuit breaker panel or housing structure 100, according to the present invention, for supporting the system illustrated in FIG. 1. The exterior of the structure 100 is similar to conventional circuit breaker panels in that it includes a metal frame with standard side and back panels 102. Unlike conventional circuit breaker panels, the structure 100 includes an electronic control board 104 with push buttons 103 for providing manual control capabilities and solid state branch breakers 106 coupled to a finned heat sink 109 for dissipating the heat generated by the solid state breakers 106. The generated heat may be dissipated from the structure 100 using a protective mesh screen 108 and/or vents in the top and bottom of the structure 100 to provide chimney-like ventilation. The main breaker can be incorporated as part of an enlarged solid state panel. Alternatively, the main breaker may be in a panel in juxtaposition with the solid state panel.

While the invention has been particularly shown and described with references to various embodiments, it will be recognized by those skilled in the art that other modifications and changes may be made to the present invention. For example, it is intended that the scope of the present invention encompasses DC and AC multiphase distributed power applications. Further, while static switch interruption devices (devices having non-moving parts), such as the solid state circuit breakers 18 and 20, have been illustrated as conventional IGBT's, any type of arrangement including a static switch interruption device capable of conducting current and blocking voltage in both directions may be used. The main circuit breaker 16 may be replaced with a shunt trip arrangement, such as a fuse in the input lines and a shorting device (e.g., a contactor or a pair of thyristors in inverse parallel), wherein the central controller actuates the shorting device when one of the solid state circuit breakers fails, thereby providing a "crowbar"-like operation. Such changes do not depart from the spirit and scope of the claimed invention which is set forth in the following claims.

What is claimed is:

1. A static switch interruption arrangement, comprising:
    a main interruption device and a static switch interruption device, connected in series in a current path between a source and a load, for interrupting and establishing current flow therebetween;
    a sensor, coupled to the current path of the static switch interruption device; and
    automatic control means, responsive to the sensor, for automatically controlling the main interruption device and the static switch interruption device, wherein the automatic control means is capable of generating a first signal to cause the static switch interruption device to interrupt the current path, and is capable of automatically generating a second signal to cause the main interruption device to interrupt the current path in response to the static switch interruption device failing;
    wherein the sensor includes a voltage sensor which senses voltage input to the static switch interruption device and wherein the automatic control means controls the static switch interruption device in response to the voltage sensor.

2. A static switch interruption arrangement according to claim 1, wherein the sensor senses the status of the static switch interruption device when it is establishing its associated current path and when it is interrupting its associated current path.

3. A static switch interruption arrangement, according to claim 1, further including time delay means, coupled with said automatic control means, for delaying current path interruption in response to a transient condition in the associated current path.

4. A static switch interruption arrangement, according to claim 1, wherein the automatic control means controls the static switch interruption device for establishing as well as for interrupting, the current path.

5. A static switch interruption arrangement comprising:
   a main interruption device and a static switch interruption device, connected in series in a current path between a source and a load, for interrupting and establishing current flow therebetween;
   a sensor, coupled to the current path of the static switch interruption device;
   automatic control means, responsive to the sensor, for automatically controlling the main interruption device and the static switch interruption device, wherein the automatic control means is capable of generating a first signal to cause the static switch interruption device to interrupt the current path, and is capable of automatically generating a second signal to cause the main interruption device to interrupt the current path in response to the static switch interruption device failing, wherein the sensor includes a voltage sensor which senses voltage input to the static switch interruption device and wherein the automatic control means control the static switch interruption device in response to the voltage sensor; and
   pair of bleeder-resistor circuits, respectively coupled to either side of the static switch interruption device and each having a terminal coupled to a ground terminal, which is used to establish an artificial neutral terminal.

6. A static switch interruption arrangement, according to claim 5, further including time delay means, coupled with said automatic control means, for delaying current path interruption in response to a transient condition in the associated current path.

7. A static switch interruption arrangement, according to claim 5, wherein the sensor includes a voltage sensor which senses voltage input to the static switch interruption device and wherein the automatic control means controls the static switch interruption device in response to the voltage sensor.

8. A static switch interruption arrangement, comprising:
   a main interruption device and a static switch interruption device, connected in series in a current path between a source and a load, for interrupting and establishing current flow therebetween;
   a sensor, coupled to the current path of the static switch interruption device; and
   automatic control means, responsive to the sensor, for automatically controlling the main interruption device and the static switch interruption device, wherein the automatic control means is capable of generating a first signal to cause the static switch interruption device to interrupt the current path, and is capable of automatically generating a second signal to cause the main interruption device to interrupt the current path in response to the static switch interruption device failing, wherein the sensor includes a voltage sensor which senses voltage input to the static switch interruption device and wherein the automatic control means controls the static switch interruption device in response to the voltage sensor, wherein the control means includes a micro-computer which is preprogrammed for comparing current, sensed by the sensor, with a threshold and for said automatic generation of the first and second signals, and further including a delay circuit arranged so that the control means does not cause interruption of any current path in response to a transient condition in the associated current path.

9. A static switch interruption arrangement, according to claim 8, wherein the sensor indicates when the static switch interruption device fails to interrupt the associated current path.

10. A static switch interruption arrangement, according to claim 8, wherein the sensor is coupled across the static switch interruption device.

11. A static switch interruption arrangement, according to claim 10, wherein the sensor includes a voltage sensor which senses voltage input to the static switch interruption device and wherein the automatic control means controls the static switch interruption device in response to the voltage sensor.

12. A solid state interruption arrangement for interrupting a current path between a load and a source, said arrangement comprising:
   main interruption means, responsive to a main interruption signal and having an input and output port, the input port being connected to receive the power from the source;
   solid state interruption means, responsive to a solid state interruption signal and having an input port connected to the output port of the main interruption means and having an output port connected to the load;
   first sensing means, coupled to the current path between the load and the solid state interruption means, for sensing a first power related parameter in the current path;
   second sensing means, coupled to the current path, for sensing a second power related parameter in the current path; and
   an automatic controller, responsive to the first and second sensing means, for determining if at least one of said first and second power related parameters exceeds a predetermined threshold and automatically generating the solid state interruption signal when the threshold is exceeded and, thereafter, automatically generating the main interruption signal in the event that the current path is not interrupted by the solid state interruption means;
   wherein each of the main and solid state interruption signals causes the associated interruption means to block the current path with the main interruption means acting to back-up the solid state interruption means and wherein one of the first and second power related parameters is voltage and the other of the first and second power related parameters is current.

13. A solid state circuit interruption arrangement, according to claim 12, wherein the first sensing means includes a voltage sensor having an output which is coupled to the automatic controller.

14. A solid state circuit interruption arrangement, according to claim 13, wherein the automatic controller automatically generates the main interruption signal to the main interruption means in response to said voltage sensor indicating that a voltage is sensed.

15. A solid state circuit interruption arrangement, according to claim 13, wherein the second sensing means includes a current sensor having an output coupled to the automatic controller.

16. A solid state circuit interruption arrangement, according to claim 15, wherein the automatic controller automatically generates the main interruption signal to the main interruption means in response to at least one of two conditions (a) said voltage sensor indicating that the sensed voltage exceeds a reference voltage and (b) the associated current sensor indicating that a current above a reference level is sensed.

17. A solid state circuit interruption arrangement, according to claim 12, further including a control station, communicatively coupled to the automatic controller, for remotely monitoring the current path.

18. A solid state circuit interruption arrangement, according to claim 17, wherein the control station further includes means for remotely controlling the main and solid state interruption signals.

19. A solid state circuit interruption arrangement, according to claim 12, wherein one of the first and second power related parameters is voltage and the other of the first and second power related parameters is current.

20. A solid state circuit interruption arrangement, according to claim 12, further including a bleeder resistor circuit comprising at least one resistor coupled to the output port of the solid state interruption means to draw a portion of current if the solid state interruption means fails in such a manner that the current path remains uninterrupted.

21. A solid state circuit interruption arrangement, for interrupting a current path between a load and a source, said arrangement comprising:
   main interruption means, responsive to a main interruption signal and having an input and output port, the input port being connected to receive the power from the source;
   solid state interruption means, responsive to a solid state interruption signal and having an input port connected to the output port of the main interruption means and having an output port connected to the load;
   first sensing means, coupled to the current path between the load and the solid state interruption means, for sensing a first power related parameter in the current path;
   second sensing means, coupled to the current path, for sensing a second power related parameter in the current path; and
   an automatic controller, responsive to the first and second sensing means, for determining if at least one of said first and second power related parameters exceeds a predetermined threshold and automatically generating the solid state interruption signal when the threshold is exceeded and, thereafter, automatically generating the main interruption signal in the event that the current path is not interrupted by the solid state interruption means;
   wherein each of the main and solid state interruption signals causes the associated interruption means to block the current path with the main interruption means acting to back-up the solid state interruption means; and
   voltage sensing means, coupled to the input port of the solid state interruption means, for generating a signal which indicates if the solid state interruption means fails in such a manner that the current path remains uninterrupted.

22. A solid state circuit interruption arrangement, comprising:
   main interruption means, responsive to a main interruption signal and having an input and output port, the input port being connected to receive the power from the source;
   solid state interruption means, responsive to a solid state interruption signal and having an input port connected to the output port of the main interruption means and having an output port connected to the load;
   first sensing means, coupled to the current path between the load and the solid state interruption means, for sensing a first power related parameter in the current path;
   second sensing means, coupled to the current path, for sensing a second power related parameter in the current path; and
   an automatic controller, responsive to the first and second sensing means, for determining if at least one of said first and second power related parameters exceeds a predetermined threshold and automatically generating the solid state interruption signal when the threshold is exceeded and, thereafter, automatically generating the main interruption signal in the event that the current path is not interrupted by the solid state interruption means;
   wherein each of the main and solid state interruption signals causes the associated interruption means to block the current path with the main interruption means acting to back-up the solid state interruption means, wherein one of the first and second power related parameters is voltage and the other of the first and second power related parameters is current; and
   means for drawing power from the current path for providing power to the solid state circuit interruption arrangement.

23. A solid state circuit interruption arrangement, according to claim 22, further including time delay means, coupled with said automatic controller, for delaying current path interruption in response to a transient condition in the associated current path.

24. A solid state interruption arrangement for interrupting a current path between a load and a source, said arrangement comprising:
   main interruption means, responsive to a main interruption signal and having an input and output port, the input port being connected to receive the power from the source;
   solid state interruption means, responsive to a solid state interruption signal and having an input port connected to the output port of the main interruption means and having an output port connected to the load;
   first sensing means, coupled to the current path between the output port of the solid state interruption means and the load, for sensing a first power related parameter in the current path;
   second sensing means, coupled to the current path between the main interruption means and the solid state interruption means, for sensing a second power related parameter in the current path;
   a pair of bleeder-resistor circuits, respectively coupled to either side of the solid state interruption means and each having a terminal coupled to a ground terminal, which is used to establish an artificial neutral terminal;
   determination means for sensing the magnitude of the current through at least one of the bleeder-resistor circuits; and
   an automatic controller, responsive to the determination means and the first and second sensing means, which determines if at least one of said first and second power related parameters exceeds a predetermined threshold and automatically generates the solid state interruption signal when the threshold is exceeded and, thereafter, automatically generates the main interruption signal in the event that the current path is not interrupted by the solid state interruption means;

wherein each of the main and solid state interruption signals causes the associated interruption means to block the current path with the main interruption means acting to back-up the solid state interruption means.

25. A solid state circuit interruption arrangement, according to claim 24, further including time delay means, coupled with said automatic controller, for delaying current path interruption in response to a transient condition in the associated current path.

26. A solid state circuit interruption arrangement, according to claim 24, wherein the determination means generates a signal which is used to detect overload currents and wherein the determination means includes amplification means for amplifying the sensed magnitude of the current through said at least one of the bleeder-resistor circuits.

27. A solid state circuit interruption arrangement, according to claim 24, wherein the determination means includes means, responsive to the solid state interruption means failing with the current path being interrupted, for detecting currents through said at least one of the bleeder-resistor circuits.

28. A solid state circuit interruption arrangement in a distributed power network wherein a common power source provides power to a plurality of loads so as to establish a plurality of current paths emanating from the source, the arrangement comprising:
    main interruption means, having an input and output port, the input port being connected to receive the power from the source;
    a plurality of solid state interruption means, each having an input port connected to the output port of the main interruption means and an output port connected to one of the loads;
    a plurality of voltage sensors each of which is coupled to the current path between the output port of an associated one of the solid state interruption means and the associated one of the loads;
    a plurality of current sensors each of which is coupled to the current path of the solid state interruption means; and
    an automatic controller responsive to each of the voltage and current sensors for detecting a fault condition in one of the current paths and automatically generating a signal to the associated solid state interruption means so that the associated current path is interrupted when the condition is detected and thereafter automatically generating a signal to the main interruption means to interrupt the power provided from the common power source in the event that the associated current path is not interrupted by the solid state interruption means.

29. A solid state circuit interruption arrangement, according to claim 28, wherein the automatic controller automatically generates the signal to the main interruption means in response to one of said voltage sensors indicating that a voltage, above a reference level, is sensed after automatically generating a signal to the associated solid state interruption means.

30. A solid state circuit interruption arrangement, according to claim 28, wherein the automatic controller automatically generates the signal to the main interruption means in response to one of said voltage sensors indicating that a voltage, above a reference level, is sensed or the associated current sensor indicating that a current, above a reference level, is sensed after automatically generating a signal to the associated solid state interruption means.

31. A solid state circuit interruption arrangement, according to claim 30, further including a housing structure having a finned heat sink for dissipating heat generated by the plurality of solid state interruption means.

32. A solid state circuit interruption arrangement, according to claim 28, further including a housing structure having a finned heat sink for dissipating heat generated by the plurality of solid state interruption means and wherein the finned heat sink includes a planar member for mounting each of said plurality of solid state interruption means.

33. A solid state circuit interruption arrangement, according to claim 28, further including means for drawing power from the current path for providing power to the solid state circuit interruption arrangement and including power-on delay means, responsive to the power being provided to the solid state circuit interruption arrangement and coupled with the automatic controller, for forcing the respective current paths of the plurality of solid state interruption means to remain interrupted for a predetermined period of time.

34. A solid state circuit interruption arrangement, according to claim 28, further including means for drawing power from the current path for providing power to the solid state circuit interruption arrangement and including power-on delay means, responsive to the power being provided to the solid state circuit interruption arrangement and coupled with the automatic controller, for preventing transients generated by making the current paths via the main interruption means.

35. A solid state circuit interruption arrangement, according to claim 28, further including a transient suppression network coupled so as to protect the main interruption means at its input port.

36. A solid state circuit interruption arrangement, according to claim 35, further including a transient suppression network coupled between the main interruption means and said plurality of solid state interruption means.

* * * * *